(12) United States Patent
Da

(10) Patent No.: US 9,107,041 B2
(45) Date of Patent: Aug. 11, 2015

(54) SYSTEMS AND METHODS FOR DETERMINING A USER EQUIPMENT LOCATION BASED ON MEASUREMENTS FROM MULTIPLE BASE STATIONS

(71) Applicant: Alcatel-Lucent USA Inc., Murray Hill, NJ (US)

(72) Inventor: Ren Da, Warren, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/961,562

(22) Filed: Aug. 7, 2013

(65) Prior Publication Data

US 2015/0045061 A1 Feb. 12, 2015

(51) Int. Cl.
*H04W 4/02* (2009.01)
*H04W 56/00* (2009.01)
*H04W 64/00* (2009.01)
*G01S 5/00* (2006.01)
*G01S 5/14* (2006.01)

(52) U.S. Cl.
CPC .............. *H04W 4/023* (2013.01); *G01S 5/0036* (2013.01); *H04W 56/001* (2013.01); *H04W 64/00* (2013.01); *G01S 5/145* (2013.01)

(58) Field of Classification Search
USPC .................... 455/456.1–456.3; 370/336, 337
See application file for complete search history.

(56) References Cited

U.S. PATENT DOCUMENTS

2014/0098798 A1* 4/2014 Khandekar et al. ........... 370/336

FOREIGN PATENT DOCUMENTS

WO WO-2013078888 A1 6/2013

OTHER PUBLICATIONS

3GPP TS 36.214: "Evolved Universal Terrestrial Radio Access (E-UTRA); Physical layer—Measurements".
3GPP TS 36.331: "Evolved Universal Terrestrial Radio Access (E-UTRA); Radio Resource Control (RRC); Protocol specification".
3GPP TS 36.355: "Evolved Universal Terrestrial Radio Access (E-UTRA); LTE Positioning Protocol (LPP)".
3GPP TS 36.455: "evolved Universal Terrestrial Radio Access (E-UTRA); LTE Postitioning Protocol A (LPPa)".
3GPP TS 36.305: "Evolved Universal Terrestrial Radio Access (E-UTRA); User Equipment (UE) poitioning in E-UTRAN".
3GPP TS 36.300: "Evolved Universal Terrestrial Radio Access (E-UTRA); Overall description; Stage 2".
International Search Report and Written Opinion dated Feb. 10, 2015.

(Continued)

*Primary Examiner* — Sam Bhattacharya
(74) *Attorney, Agent, or Firm* — Harness, Dickey & Pierce, P.L.C.

(57) ABSTRACT

Methods and systems for determining a location of a UE includes receiving UE position information from a UE being serviced by a plurality of base stations. The UE position information may include a signal reception time and a signal transmission time or a timing advance for at least two of the plurality of base stations. The signal transmission time being a measured time for a signal being transmitted by the UE to be received by a base station, the signal reception time being a measured time for a signal being transmitted by the base station to be received by the UE, and the timing advance being a difference between the signal transmission time and the signal reception time for the base station. The method may include determining a location of the UE based on the received UE position information.

20 Claims, 3 Drawing Sheets

(56) References Cited

OTHER PUBLICATIONS

Catt: "Discussion on the Enhancement of TA Acquisition for E-CID," 3GPP Draft; R2-123588, 3rd Generation Partnership Project (3GPP), Mobile Competence Centre; 650, Route Des Lucioles; F-06921 Sophia-Antipolis Cedex; France, vol. RAN WG2, No. Qingdao; Aug. 7, 2012, XP050665622.

Catt: "Supporting the Enhancement of TA Acquisition for E-CID," 3GPP Draft; 36331_CRXXXX_(REL-11_R2-123589, 3rd Generation Partnership Project (3GPP), Mobile Competence Centre; 650, Route Des Lucioles; F-06921 Sophia-Antipolis Cedex; France, vol. RAN WG2, NO. Qingdao; Aug. 7, 2012, XP050665488.

Yilin Zhao et al., "Standardization of Mobile Phone Positioning for 3G Systems," IEEE Communications Magazine, vol. 40, No. 7, Jul. 1, 2002, pp. 108-116, XP055081830.

"3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 11)," 3GPP Standard; 3GPP TS 36.305, 3rd Generation Partnership Project (3GPP), Mobile Competence Centre; 650, Route Des Lucioles; F-06921 Sophia-Antipolis Cedex; France, vol. RAN WG2, No. V11.3.0, Mar. 15, 2013, pp. 1-58, XP050692266.

"3rd Generation Partnership Project; Technical Specification Group Radio Access Network; Evolved Universal Terrestrial Radio Access Network (E-UTRA); LTE Positioning Protocol (Release 11)," 3GPP Standard; 3GPP TS 36.305, 3rd Generation Partnership Project (3GPP), Mobile Competence Centre; 650, Route Des Lucioles; F-06921 Sophia-Antipolis Cedex; France, vol. RAN WG2, No. V11.3.0, Jun. 29, 2013, pp. 1-118, XP050712008.

"3rd Generation Partnership Project; Technical Specification Group Radio Access Network; Evolved Universal Terrestrial Radio Access Network (E-UTRA); LTE Positioning Protocol A (LPPa) (Release 11)," 3GPP Standard; 3GPP TS 36.455, 3rd Generation Partnership Project (3GPP), Mobile Competence Centre; 650, Route Des Lucioles; F-06921 Sophia-Antipolis Cedex; France, vol. RAN WG2, No. V11.3.0, Jun. 27, 2013, pp. 1-60, XP050711890.

"3rd Generation Partnership Project; Technical Specification Group Radio Access Network; Evolved Universal Terrestrial Radio Access Network (E-UTRA); Physical Layer; Measurements (Release 11)," 3GPP Standard; 3GPP TS 36.214, 3rd Generation Partnership Project (3GPP), Mobile Competence Centre; 650, Route Des Lucioles; F-06921 Sophia-Antipolis Cedex; France, vol. RAN WG2, No. V11.1.0, Dec. 15, 2012, pp. 1-14, XP050691178.

Rhode and Schwarz, "LTE-Advanced (3GPP Rel. 11) Technology Introduction White Paper," Jul. 1, 2013, pp. 1-39, XP055166782.

NTT DOCOMO, "Views on TM9 and CA Based Approaches for Rel-11 CoMP," 3GPP Draft; R1-120403 Comp CA, 3rd Generation Partnership Project (3GPP), Mobile Competence Centre; 650, Route Des Lucioles; F-06921 Sophia-Antipolis Cedex; France, vol. RAN WG1, No. Dresden, Germany, Jan. 31, 2012, XP050562893.

\* cited by examiner

SYSTEMS AND METHODS FOR DETERMINING A USER EQUIPMENT LOCATION BASED ON MEASUREMENTS FROM MULTIPLE BASE STATIONS

BACKGROUND

Wireless cellular networks may include several cells, where each cell includes a base station that provides mobile communications and network services to mobile devices or user equipment (UE). In the wireless cellular networks, signals from one or more UEs in a cell coverage area of a base station are received by the base station, which then connects a call to a land-line telephone network and/or connects the UE to a network, such as the internet. In typical wireless cellular systems, a UE is serviced by one base station.

Wireless networks using the long-term evolution (LTE) standard may employ features, such as Carrier Aggregation (CA) and Coordinated Multi-Point Operation (CoMP), that allow UEs to be serviced by more than one base station. For example, when a UE works under the CA mode, the UE may be served by two or more cells, where one of the cells acts as a primary serving cell, and other cells act as secondary serving cells. Similarly, CoMP allows UEs to be served by more than one base station in order to enhance quality of service (QoS) on the perimeter of a serving cell.

Many wireless network applications use a location and/or position of a UE within a cell coverage area (e.g., power allocation algorithms, and the like). A difference between a signal reception (Rx) time and a signal transmission (Tx) time is used to determine a general location and/or position of a UE within a cell coverage area. An Rx and Tx time difference measurement may be referred to as a "round-trip propagation delay" or a "round-trip delay". Currently, the LTE standard allows UEs to report Rx and Tx time difference measurements to a location server 200 via LTE positioning protocol (LPP). However, the Rx and Tx time difference measurements are only reported for a primary serving cell, not for secondary serving cells.

An accurate location of the UE may not be ascertained using the Rx and Tx time difference measurements from only one base station. Rather, the Rx and Tx time difference measurements from only one base station may only be used to determine that a UE is located within a cell coverage area. Therefore, other information such as Angle of Arrival (AoA) and/or signal strength measurements, such as receiver reference signal power (RSRP) and/or reference signals received quality (RSRQ) measurements are used to determine a UE's specific position within a cell coverage area. Because AoA, RSRP, and/or RSRQ are not direct distance measurements, there may be uncertainty in determining a UE's location and/or position.

SUMMARY

At least one example embodiment relates to a method for determining a position of a user equipment (UE).

According to an example embodiment, a method for determining a location of a UE includes receiving UE position information from a UE being serviced by a plurality of base stations. The UE position information may include a signal reception time and a signal transmission time or a timing advance for at least two of the plurality of base stations. The signal transmission time being a measured time for a signal being transmitted by the UE to be received by a base station, the signal reception time being a measured time for a signal being transmitted by the base station to be received by the UE, and the timing advance being a difference between the signal transmission time and the signal reception time for the base station. The method may include determining a location of the UE based on the received UE position information.

In one example embodiment, the determining may include calculating a difference between the signal reception time and the signal transmission time for each of the at least two base stations, and determining a distance from the UE to each of the at least two base stations. Each distance may be based on half of the calculated difference for a respective one of the at least two base stations.

In one example embodiment, the determining may further include determining a cell coverage area for of the at least two base stations, and determining an intersection point where each cell coverage area intersects. The location of the UE may be based on the intersection point.

In one example embodiment, the intersection point is the location of the UE.

In one example embodiment, a respective cell coverage area has a radius based on the distance from the UE to a corresponding one of the at least two base stations.

In one example embodiment, the receiving may include sending a request message to the UE, where the request message including a request for the UE position information and a required response time; determining if the required response time has lapsed; and receiving a location message if the determining determines that the required response time has not lapsed. The location message may include the UE position information.

In one example embodiment, the receiving may further include re-sending the request message if the determining determines that the required response time has lapsed and the location message has not been received.

In one example embodiment, the receiving may include receiving a location message including the UE position information, the location message being received on a periodic basis.

In one example embodiment, one of the plurality of base stations acts as a primary serving cell, and the other base stations of the plurality of base stations act as secondary serving cells.

According to another example embodiment, a method for determining a location of a UE is provided. The method may include receiving UE position information from a UE that is serviced by a plurality of base stations. The UE position information may include a signal reception time and a signal transmission time or a timing advance for at least two of the plurality of base stations. The signal transmission time being a measured time for a signal being transmitted by the UE to be received by a base station, the signal reception time being a measured time for a signal being transmitted by the base station to be received by the UE, and the timing advance being a difference between the signal transmission time and the signal reception time for the base station. The method may include determining a location of the UE based on the received UE position information without requiring at least one of an angle of arrival (AoA) measurement, a reference signals received power (RSRP) measurement, and a reference signals received quality (RSRQ) measurement.

At least one example embodiment relates to a location server.

According to an example embodiment, the location server determines a location of a UE. The location server may be configured to receive UE position information from a UE that is serviced by a plurality of base stations. The UE position information may include a signal reception time and a signal transmission time or a timing advance for at least two of the plurality of base stations. The signal transmission time is a measured time for a signal is transmitted by the UE to be received by a base station, the signal reception time is a measured time for a signal being transmitted by the base station to be received by the UE, and the timing advance is a difference between the signal transmission time and the signal reception time for the base station. The location server may be configured to determine a location of the UE based on the received UE position information.

In one example embodiment, in the determining, the location server may be configured calculate a difference between the signal reception time and the signal transmission time for each of the at least two base stations, and determine a distance from the UE to the at least two base stations. Each distance may be based on half of the calculated difference for a respective one of the at least two base stations.

In one example embodiment, in the determining, the location server may be further configured to determine a cell coverage area for of the at least two base stations, and determine an intersection point where each cell coverage area intersects. The location of the UE may be based on the intersection point.

In one example embodiment, the intersection point is the location of the UE.

In one example embodiment, a respective cell coverage area has a radius based on the distance from the UE to a corresponding one of the at least two base stations.

In one example embodiment, in the receiving, the location server may be configured to send a request message to the UE, the request message may include a request for the UE position information and a required response time; determine if the required response time has lapsed; and receive a location message if the required response time has been determined to have not lapsed, the location message including the UE position information.

In one example embodiment, in the receiving, the location server may be further configured to re-send the request message if the required response time has been determined to have lapsed and the location message has not been received.

In one example embodiment, in the receiving, the location server may be configured to receive a location message including the UE position information, where the location message is received on a periodic basis.

In one example embodiment, one of the plurality of base stations acts as a primary serving cell, and the other base stations of the plurality of base stations act as secondary serving cells.

According to another example embodiment, a location server may determine a location of a UE. The location server may be configured to receiving UE position information from a UE that is serviced by a plurality of base stations. The UE position information may include a signal reception time and a signal transmission time for or a timing advance for at least two of the plurality of base stations. The signal transmission time is a measured time for a signal is transmitted by the UE to be received by a base station, the signal reception time is a measured time for a signal being transmitted by the base station to be received by the UE, and the timing advance is a difference between the signal transmission time and the signal reception time for the base station. The location server may be configured to determine a location of the UE based on the received UE position information without requiring at least one of an angle of arrival (AoA) measurement, a reference signals received power (RSRP) measurement, and a reference signals received quality (RSRQ) measurement.

BRIEF SUMMARY OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

Figure 1A:
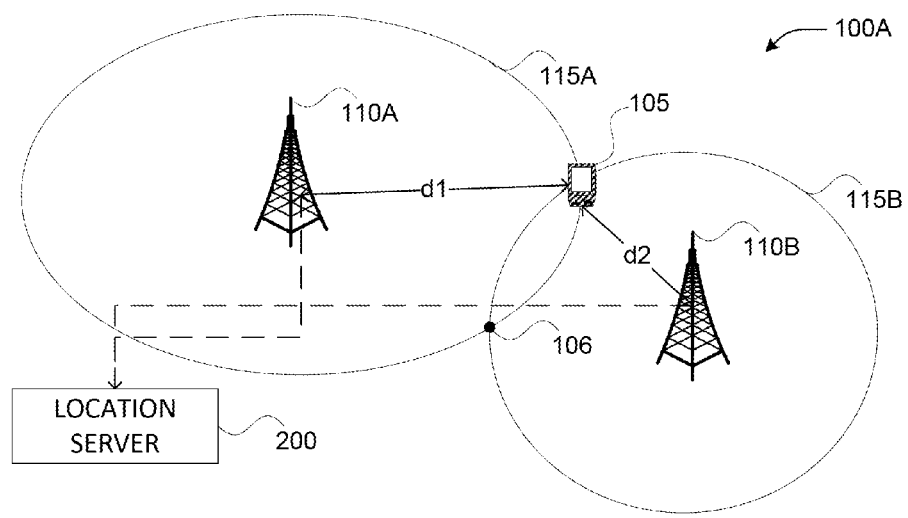
FIG. 1A illustrates an example of a communications network, according to an example embodiment.

Various example embodiments will now be described more fully with reference to the accompanying drawings in which some example embodiments of the invention are shown.

Detailed illustrative embodiments are disclosed herein. However, specific structural and functional details disclosed herein are merely representative for purposes of describing example embodiments of the present invention. This invention may, however, may be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments.

However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used herein, the term "user equipment" may be considered synonymous to, and may hereafter be occasionally referred to, as a client, mobile, mobile terminal, user terminal, mobile unit, mobile station, mobile user, UE, subscriber, user, remote station, access agent, user agent, receiver, etc., and may describe a remote user of network resources in a communications network. Furthermore, the term "mobile terminal" may include any type of wireless/wired device such as consumer electronics devices, smart phones, tablet personal computers, personal digital assistants (PDAs), desktop computers, and laptop computers, for example.

As used herein, the term "network element", may be considered synonymous to and/or referred to as a networked computer, networking hardware, network equipment, router, switch, hub, bridge, gateway, or other like device. The term "network element" may describe a physical computing device of a wired or wireless communication network and configured to host a virtual machine. Furthermore, the term "network element" may describe equipment that provides radio baseband functions for data and/or voice connectivity between a network and one or more users. The term "network element", may be considered synonymous to and/or referred to as a "base station". As used herein, the term "base station", may be considered synonymous to and/or referred to as an enhanced or evolved Node B (eNB), base transceiver station (BTS), NodeB, access point (AP), etc. and may describe equipment that provides the radio baseband functions for data and/or voice connectivity between a network and one or more users.

Example embodiments may be utilized in conjunction with radio access networks (RANs) such as: Universal Mobile Telecommunications System (UMTS); Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; the code division multiple access (CDMA) system described in EIA/TIA IS-95; a High Rate Packet Data (HRPD) system, Worldwide Interoperability for Microwave Access (WiMAX); ultra mobile broadband (UMB); $3^{rd}$ Generation Partnership Project LTE (3GPP LTE); and $4^{th}$ Generation LTE.

Exemplary embodiments are discussed herein as being implemented in a suitable computing environment. Although not required, exemplary embodiments will be described in the general context of computer-executable instructions, such as program modules or functional processes, being executed by one or more computer processors (CPUs). Generally, program modules or functional processes include routines, programs, objects, components, data structures, etc. that performs particular tasks or implement particular data types. The program modules and functional processes discussed herein may be implemented using existing hardware in existing communication networks. For example, program modules and functional processes discussed herein may be implemented using existing hardware at existing network elements or control nodes. Such existing hardware may include one or more digital signal processors (DSPs), application-specific-integrated-circuits, field programmable gate arrays (FPGAs) computers or the like.

FIG. 1A illustrates an example of a communications network, according to an example embodiment. A communications network 100A includes user equipment (UE) 105, secondary intersection point 106, base stations (BSs) 110A-B, cell coverage areas 115A-B, and location server 200.

Figure 1B:
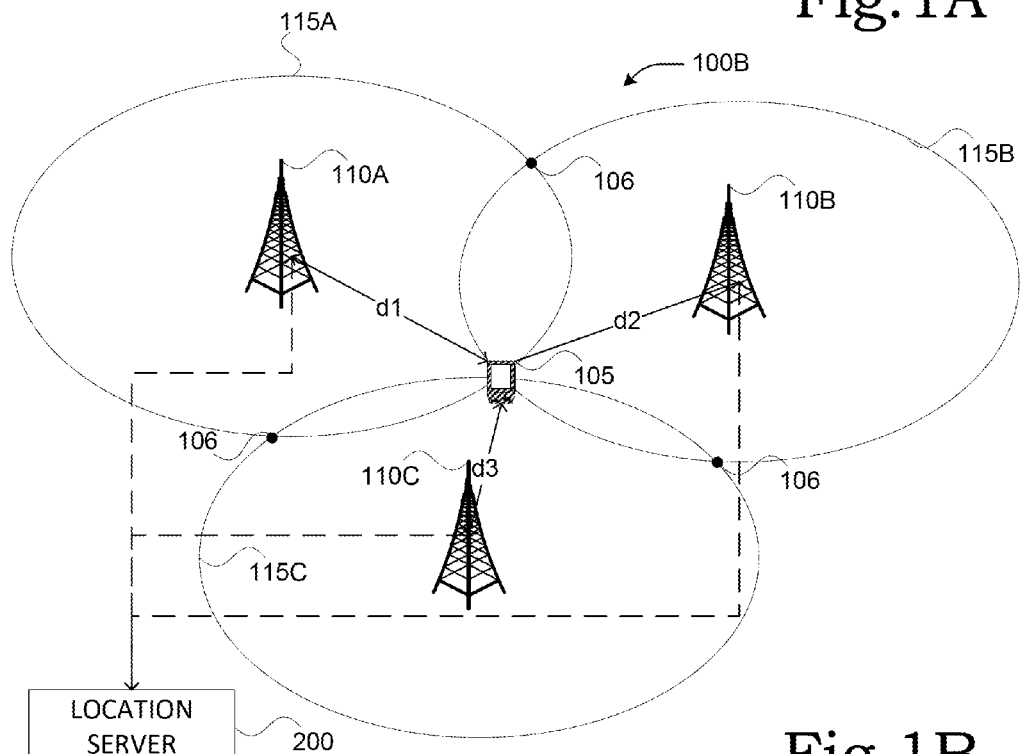
FIG. 1B illustrates an example of a communications network, according to another example embodiment.

FIG. 1B illustrates an example of a communications network, according to another example embodiment. A communications network 100B includes user equipment (UE) 105, secondary intersection points 106, base stations (BSs) 110A-C, cell coverage areas 115A-C, and location server 200.

Each of the UEs 105 may include a transceiver, memory, and processor. UEs 105 may be configured to send/receive data to/from BSs 110A-C. UEs 105 may be designed to sequentially and automatically carry out a sequence of arithmetic or logical operations may be equipped to record/store digital data on a machine readable medium, and may be transmit and receive digital data via BSs 110A-C. UEs 105 may be wireless phones, laptop personal computers, tablet personal computers, and/or any other physical or logical device capable of recording, storing, and/or transferring digital data via BS 110. Each of the UEs 105 may include a wireless transceiver configured to operate in accordance with wireless communications standards, such as CDMA, GSM, LTE, WiMAX, or other like wireless communications standards. Furthermore, UEs 105 may be configured to measure and/or record network loading information, QoS parameters, round-trip propagation delay, angle of arrival (AoA), and/or other like characteristics. Network loading information may include a received signal strength indicator (RSSI), received channel power indicator (RCPI), receiver reference signal power (RSRP), reference signals received quality (RSRQ) measurements, path loss measurements, packet delay time, and/or other like information that may indicate a level or amount of traffic in a communications network. QoS parameters may include a call drop rate, a signal to noise ratio, a measure of throughput, a delay, a jitter, a handover success rate, a service response time, a number of interrupts, and/or other like parameters. Furthermore, UEs 105 may be configured to transmit the measured and/or recorded network loading information, QoS parameters, and other like characteristics to BSs 110A-C.

BSs 110A-C may be configured to provide wireless communication services to mobile terminals (i.e., UEs 105) within a geographic area, or cell coverage area (i.e., cell coverage areas 115A-C), associated with the BSs 110A-C. The BSs 110A-C may provide wireless communication services to UEs 105 via a link for each user terminal 105. Links between BSs 110A-C and each of the UEs 105 may include one or more downlink (or forward) channels for transmitting information from BSs 110A-C to UEs 105 and one or more uplink (or reverse) channels for transmitting information from UEs 105 to the BSs 110A-C. It should be noted that BSs 110A-C may provide the same or similar wireless communications services to multiple mobile terminals and/or other like devices (e.g., autonomous sensors, Machine Type Communications (MTC) devices, machine to machine (M2M) devices, and the like).

In various embodiments, BSs 110A-C may include a processor and transmitter/receiver connected to one or more antennas and an electronic switching function. The one or more transmitters/receivers may be configured to transmit/receive data signals to/from one or more UEs 105 within its cell coverage area via one or more links that may be associated with a transmitter and a receiver. In various embodiments, BSs 110A-C may be configured to operate a channel access method, such as code division multiple access (CDMA), orthogonal frequency-division multiple access (OFDMA), frequency division multiple access (FDMA), time division multiple access (TDMA), packet mode multiple-access, space division multiple access (SDMA), or other like channel access methods or combination thereof. In various embodiments, BSs 110A-C may employ the E-UTRA protocols (i.e., OFDMA for downlink communications and SC-FDMA for uplink communications) using the LTE interface to connect with, or otherwise communicate with, UEs 105.

In various embodiments, BSs 110A-C may be configured to employ one or more wireless communications standards, such as CDMA, GSM, LTE, WiMAX, or other like wireless communications standard. BSs 110A-C may also be configured to connect to a service provider's network via hard link, such as a packet switched network, a mobile switching center, or via other like connection means. The electronic switching function may be a "Mobile Switching Center" (MSC) when BS 110 employs a GSM, AMPTS, NMT and CDMA system. Alternatively, a "Media Gateway" (MGW)/"Gateway MSC Server" (GMSC) may be used if BS 110 employs a 3G/4G mobile system. In various embodiments, the aforementioned functions may be provided by separate components or devices.

In various embodiments, where BSs 110A-C use the LTE wireless communication protocol, BSs 110A-C may comprise components of the System Architecture Evolution (SAE) with an Evolved Packet Core (EPC) as described by the 3rd Generation Partnership Project (3GPP). In such embodiments, BSs 110A-C may include components such as a Mobility Management Entity (MME), Serving Gateway (SGW), PDN Gateway (PGW), Home Subscriber Server (HSS), Access Network Discovery and Selection Function (ANDSF), Evolved Packet Data Gateway (ePDG), and/or other like components as are known. In various embodiments, the aforementioned components may be employed by separate devices.

In various embodiments, BSs 110A-C may be configured to operate a collision detection method, such as a carrier sense multiple access (CSMA) protocol, which is a probabilistic Media Access Control (MAC) protocol in which a device verifies the absence of other traffic before transmitting on a shared transmission medium. The CSMA protocol may employ a collision avoidance protocol, in which a device only transmits when a channel is sensed to be idle. Alternatively, the CSMA protocol may employ a collision detection (CD) protocol, in which a device terminates a transmission as soon as a collision is detected. However, embodiments are not limited to the collision detection methods described above and may encompass any type of collision detection method. Additionally, the CSMA protocol may be enhanced with a Request-to-Send/Clear-to-Send (RTS/CTS) protocol, in which a device wishing to send data initiates the process by sending a request to send frame (RTS) and the destination device replies with a clear to send frame (CTS).

Cell coverage areas 115A-C may be geographic and/or other area that is supplied with telecommunications and network services by a corresponding base station (i.e., BSs 110A-C). For example, FIG. 1A shows cell coverage area 115A surrounding BS 110A, such that the area represented by cell coverage area 115A may be supplied with telecommunications and network services by BS 110A. It should be noted that in some embodiments the cell coverage areas 115A-C, as shown in FIGS. 1A-B, may represent a boundary for providing telecommunications and network services. However, in various embodiments, BSs 110A-C may be configured to provide telecommunications and network services to UE's outside of the cell coverage areas 115A-C (not shown).

As shown in FIGS. 1A-B, cell coverage areas 115A-C are represented by circular shapes. In various embodiments, a shape of the cell coverage areas 115A-C may be hexagonal, elliptical, square, rectangular, irregular, and/or other like polygon represented by a plurality of vertices. In some embodiments, cell coverage areas 115A-C may be a vertical delimitation of space and/or three-dimensional (3D) shape (e.g., one or more floors in a building being serviced by a femtocell, picocell, or other like network device) (not shown).

Each of the cell coverage areas 115A-C may be assigned multiple frequencies for transmitting/receiving signals to/from UEs 105. For example, FIG. 1A shows UE 105 within a cell coverage area provided by BS 110A and BS 110B, and thus both BS 110A and BS 110B may provide wireless communication services to UE 105 via respective links. Links between the BSs 110A-B and UE 105 may include one or more downlink (or forward) channels for transmitting information from BSs 110A-B to UE 105 and one or more uplink (or reverse) channels for transmitting information from UE 105 to the BSs 110A-B. Furthermore, in embodiments employing the LTE standard, carrier aggregation (CA) may be used such that one of the cell coverage areas 115A-C provided by the corresponding BSs 110A-C may act as a primary serving cell for the UE 105, and the other cell coverage areas provided by BSs may act as a secondary serving cells for the UE 105.

Location server 200 is a network element that may include one or more systems and/or applications for determining a position and/or location of a UE within a wireless communications network. Location server 200 may include a processor, memory or computer readable storage medium, and a network interface. In some embodiments, location server 200 may include a transmitter/receiver connected to one or more antennas. The location server 200 may be a network element, such as a Serving Mobile Location Center (SMLC), an Evolved Serving Mobile Location Center (E-SMLC), Gateway Mobile Location Center (GMLC), Stand Alone Serving Mobile Location Center (SAS), Secure User Plane Location Platform (SLP), or other like network device as defined by the LTE standard or other like communications standard. Accordingly, location server 200 may be configured to communicate with the BSs 110A-C via a wired or wireless protocol. Additionally, location server 200 may be a separate physical hardware device, or location server 200 may be physically or logically grouped together with other network devices, such that the location server 200 may reside on one or more physical hardware devices of a serving base station.

In various embodiments, location server 200 may be configured to operate a UE location determination algorithm. According to various embodiments, location server 200 may be configured to receive UE position information, network loading information, QoS parameters, and/or other like characteristics, as measured and/or recorded by the UEs 105, and determine a position and/or location of the UEs 105 based on the received UE position information, network loading information, QoS parameters, and/or other like characteristics. Furthermore, location server 200 may be connected to, or communicate with one or more local and/or remote databases (not shown).

Referring to FIG. 1A, according to various embodiments, communications network 100A may operate as follows. First, a signal reception (Rx) time and a signal transmission (Tx) time may be measured by UE 105. The UE 105 may be configured to measure the Rx time and the Tx time for both the BS 110A and BS 110B, and communicate the measured Rx time and Tx time for each BSs 110A-B to location server 200 via one or both BSs 110A-B. The location server 200 may then determine a Rx-Tx time difference for each serving cell.

In various embodiments, a UE measured Rx time may be a recorded time that a UE receives a downlink radio frame from a serving cell. The Rx time may be a measured time for a signal that is transmitted by a base station (i.e., each of the BSs 110A-B) to be received by the UE 105. In various embodiments, a UE measured Tx time may be a recorded time that a UE transmits an uplink radio frame. The Tx time may be a measured time for a signal that is transmitted by the UE 105 to be received by a base station (i.e., each of the BSs 110A-B). Thus, the Rx-Tx time difference for a serving cell may be a difference between the UE's transmit and the UE's reception time. In various embodiments, a Rx-Tx time difference may be a timing advance, as defined by the Enhanced Cell Identity (E-CID) protocol. E-CID is a positioning feature used in the LTE standard, where a UE reports serving cell identification information, the timing advance, estimated timing and power of the detected neighbor cells, AoA and/or signal strength measurements, such as RSRP and/or RSRQ measurements.

Once the location server 200 determines the Rx-Tx time difference for each serving cell, the location server 200 may estimate the position of the UE 105 based on the UE Rx-Tx time difference and the received E-CID information. In various embodiments, the location server 200 may determine the position of the UE 105 by first determining a distance from the UE 105 to each one of the serving base stations, determining a cell coverage area for each serving base station (e.g., cell coverage areas 115A and 115B for BSs 110A and 110B, respectively), and determining an intersection point where each cell coverage area intersects.

In various embodiments, a distance from the UE 105 to a serving base station may be calculated as half of the Rx-Tx time difference for the serving of base stations, or the Rx-Tx time difference divided by two (2). In some embodiments, the location server 200 may also use signal strength measurements to determine a distance from the UE 105 to a serving base station. Additionally, in some embodiments, an offset value, spacing information, and/or other like constant value may be taken into account when determining a distance from the UE 105 to a serving base station.

In various embodiments, the location server 200 may determine a cell coverage area for each serving cell by mapping or otherwise charting a polygon having a vertex based on the determined distance from the UE 105 to each one of the BSs 110A-B. For example, the location server 200 may map or chart a circle around each of the BSs 110A-B, where each circle has a radius equal to determined distance from the UE 105 to each one of the BSs 110A-B. As shown in FIG. 1A, cell coverage area 115A is a elliptical shape having a radius equal to a distance d1 of the UE 105 to the BS 110A, and cell coverage area 115B is a circular shape having a radius equal to a distance d2 of the UE 105 to the BS 110B. In some embodiments, the offset value, spacing information, and/or other like constant value may be taken into account when determining a distance from the UE 105 to a serving base station. Furthermore, known base station position, geographic location, and/or other like network topology information may be used when determining a cell coverage area for each serving base station.

In various embodiments, the location server 200 may determine the location of the UE based on the intersection point where each cell coverage area intersects. In instances where a UE is being serviced by two base stations, the cell coverage areas may intersect at more than one location. For example, as shown in FIG. 1A, the cell coverage area 115A intersects with cell coverage area 115B at UE 105 and at secondary intersection point 106. In such instances, the location of the UE 105 may be discerned or otherwise differentiated from the secondary intersection point 106 using other information, such as AoA, RSRP, RSRQ, and/or other like measurements.

Accordingly, the location server 200 may determine the position of the UE 105 by determining a distance from the UE 105 to each one of the serving base stations, determining a cell coverage area for each serving base station, determining intersection points where each cell coverage area intersects, and discerning or differentiating between the UE location and any secondary intersection points using other information, such as AoA, RSRP, RSRQ, and/or other like measurements.

Referring to FIG. 1B, according to various embodiments, communications network 100B may operate in the same or a similar manner as discussed above with regard to FIG. 1A. In embodiments where more than two base stations service a UE, as is shown in FIG. 1B, the location server 200 may determine the location of the UE based on the intersection point where each cell coverage area intersects. In such embodiments, the location server 200 may determine the location of the UE without requiring additional information (e.g., AoA, RSRP, RSRQ, and the like). This is because, when more than two base stations are serving a UE, more than two cell coverage areas of the serving base stations do not intersect at more than one point. For example, as shown in FIG. 1B, the cell coverage areas 115A-C intersect only at UE 105. In such instances, the secondary intersection points 106 may be disregarded because only two of the BSs 110A-C intersect at the secondary intersection points 106. Accordingly, the location of the UE 105 may be determined without using the AoA, RSRP, RSRQ, and/or other like measurements by determining the intersection point of all the serving cells.

Although FIG. 1B shows that three base stations (i.e., BSs 110A-C) serving the UE 105, it should be noted that, in some embodiments, communications network 100B may include many more base stations than those shown in FIG. 1B. It should also be noted that communications networks 100A-B may include network devices as defined by the LTE standard or other like standard. However, it is not necessary that all of these generally conventional components be shown in order to understand the illustrative embodiments as described above.

Figure 2:
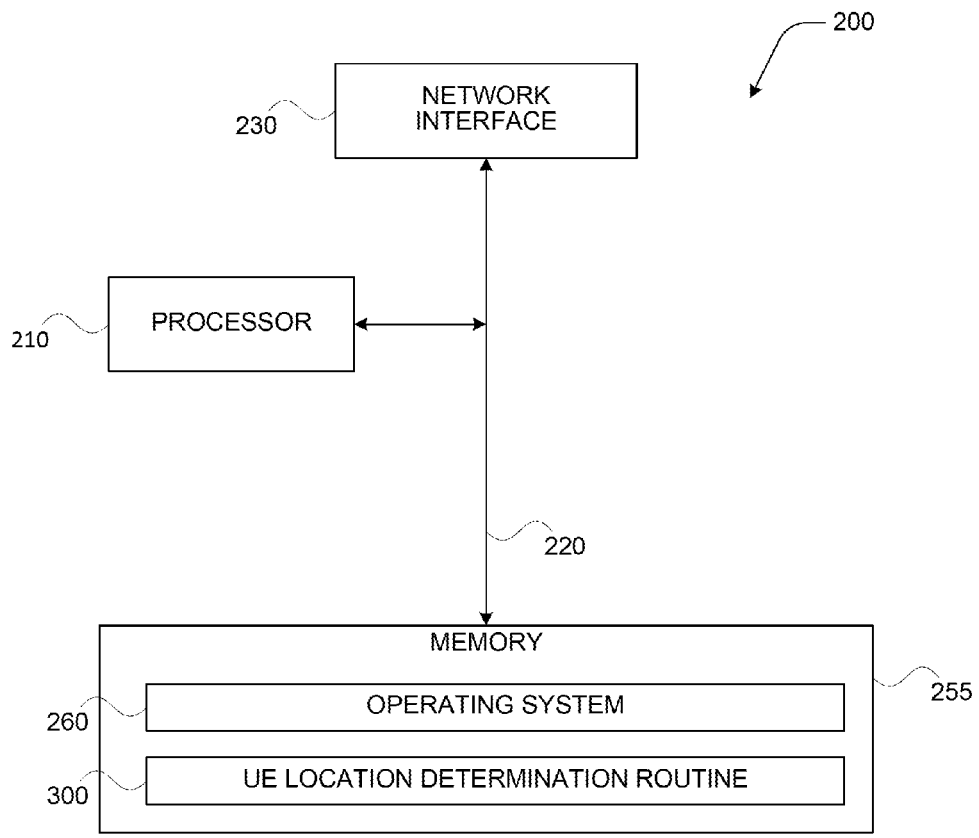
FIG. 2 illustrates the components of a location server 200 being employed by a communication network according to an example embodiment.

FIG. 2 illustrates the components of location server 200 that may be employed by a communication network (e.g., communications networks 100A-B) according to an example embodiment. As shown, the location server 200 includes processor 210, bus 220, network interface 230, and memory 255. During operation, memory 255 includes operating system 260 and UE location determination routine 300. In some embodiments, the location server 200 may include many more components than those shown in FIG. 2. However, it is not necessary that all of these generally conventional components be shown in order to understand the illustrative embodiment.

Memory 255 may be a computer readable storage medium that generally includes a random access memory (RAM), read only memory (ROM), and/or a permanent mass storage device, such as a disk drive. Memory 255 also stores operating system 260 and program code for UE location determination routine 300. These software modules may also be loaded from a separate computer readable storage medium into memory 255 using a drive mechanism (not shown). Such separate computer readable storage medium may include a floppy drive, disc, tape, DVD/CD-ROM drive, memory card, or other like computer readable storage medium (not shown). In some embodiments, software modules may be loaded into memory 255 via network interface 230, rather than via a computer readable storage medium.

Processor 210 may be configured to carry out instructions of a computer program by performing the basic arithmetical, logical, and input/output operations of the system. Instructions may be provided to processor 210 by memory 255 via bus 220.

Bus 220 enables the communication and data transfer between the components of the location server 200. Bus 220 may comprise a high-speed serial bus, parallel bus, storage area network (SAN), and/or other suitable communication technology.

Network interface 230 is a computer hardware component that connects the location server 200 to a computer network. Network interface 230 may connect the location server 200 to a computer network via a wired or wireless connection. Accordingly, location server 200 may be configured to communicate with one or more serving base stations via the network interface 230.

Figure 3:
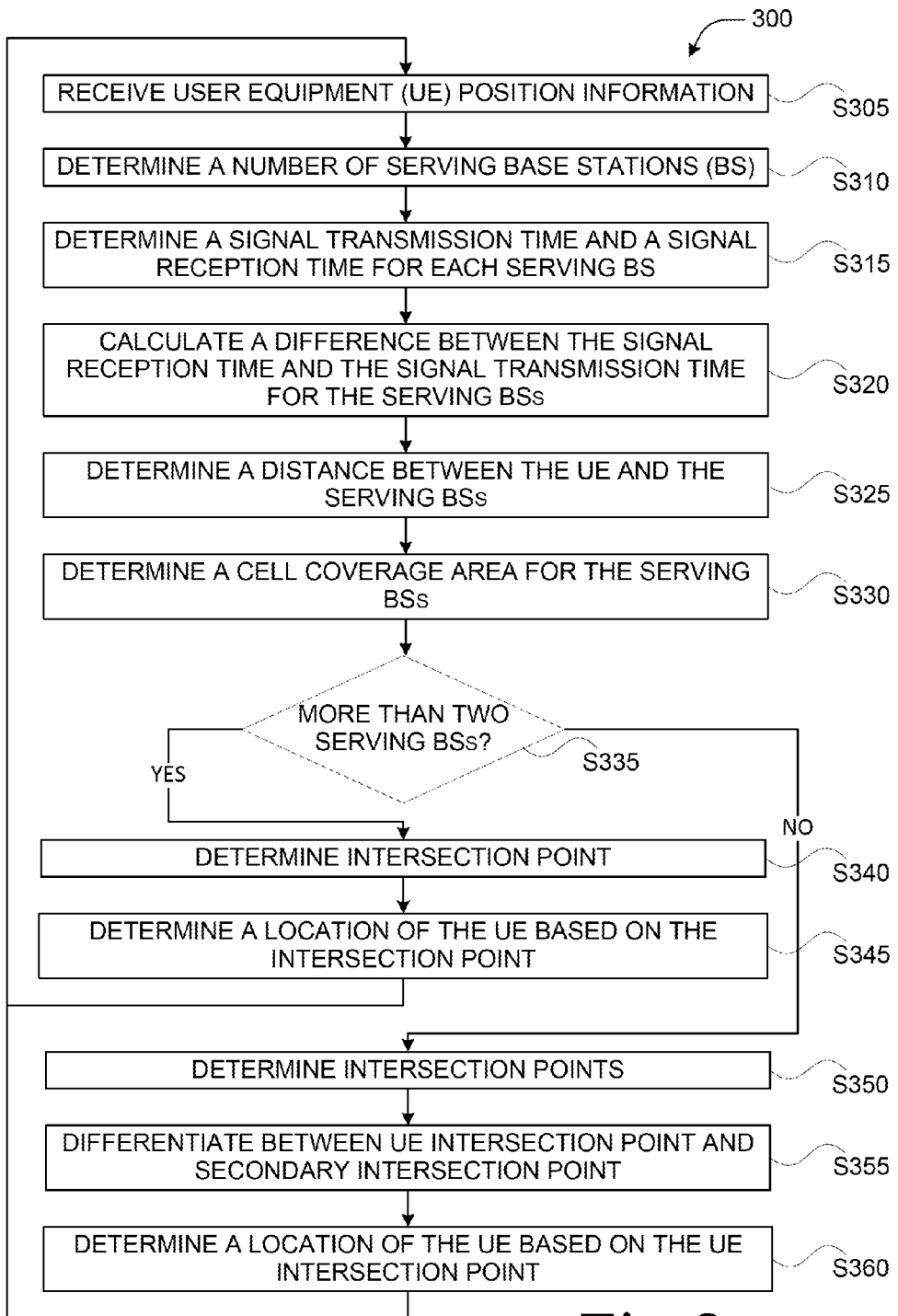
FIG. 3 shows a user equipment (UE) position determination routine according to an example embodiment.

FIG. 3 shows a UE location determination routine 300, according to an example embodiment. UE location determination routine 300 may be used to determine a location and/or position of a UE within one or more cell coverage areas of at least two base stations. For illustrative purposes, the operations of UE location determination routine 300 will be described as being performed by the location server 200 as described above with respect to FIG. 2. However, it should be noted that other similar network devices may operate the UE location determination routine 300 as described below.

Referring to FIG. 3, as shown in operation S305, the location server 200 receives UE position information. As discussed above, UEs associated with the one or more serving base stations configured to measure and/or record Rx time and Tx time, round-trip propagation delay, and E-CID information, such as a timing advance, AoA measurements, RSRP measurements, RSRQ measurements, and/or other like characteristics. According to various embodiments, the measured position information and/or E-CID information may be sent to location server 200 via one or more serving base stations.

According to various embodiments, the location server 200 may request the UE position information from the UE. For example, the location server 200 may employ the LTE positioning protocol (LPP) in order to receive the position information and/or E-CID information. In such instances, the location server 200 may send a LPP Request Location Information message to the UE. The request message may include the E-CID measurements requested by the location server 200 and/or a required response time. In response to the LPP Request Location Information message, the UE may perform the E-CID measurements and send an LPP Provide Location Information message to the location server 200 before the response time has elapsed. In embodiments, the LPP Provide Location Information may be modified in order to include the Rx–Tx time difference measurements, timing advance, E-CID information, and/or other like position information from the primary serving cell and the secondary serving cells.

According to various embodiments, the position information may be sent to the location server 200 on a periodic and/or cyclical basis (e.g., at a certain time of day or at a time interval). In various embodiments, the location server 200 may poll, page, or otherwise request the position information from the UE. For example, according to the LPP protocol, a UE may send an LPP Provide Location Information message to the location server 200. The Provide Location Information message may include any UE measurements already available at the UE. In such embodiments, the LPP Provide Location Information may be modified in order to include Rx–Tx time difference measurements, E-CID information, and/or other like position information from the primary serving cell and secondary serving cells.

As shown in operation S310, the location server 200 determines a number of serving base stations. In various embodiments, the number of serving base stations may be determined from the E-CID information reported to the location server 200. In other embodiments, the number of serving base stations may be reported to the location server 200 using the modified LPP Provide Location Information message, as discussed above.

As shown in operation S315, the location server 200 determines a signal transmission (Tx) time and a signal reception (Rx) time for serving base stations. As discussed above, the UE may be configured to measure, record, and report the Tx time and Rx time to the location server 200. In various embodiments, the Tx time and Rx time may be reported as a timing advance, a round-trip delay, and the like using the modified LPP Provide Location Information message, as discussed above.

As shown in operation S320, the location server 200 calculates a difference between the Rx time and the Tx time for serving base stations. In various embodiments, the location server 200 may subtract the Tx time from the Rx time in order to determine a difference between the Rx time and the Tx time. In other embodiments, such as when the timing advance for respective serving base stations is received, this difference need not be calculated; thus in some embodiments operation S320 may not need be performed when the timing advance is received in operation S315. In other embodiments, an offset or other like constant may be applied to the difference between the Rx time and the Tx time.

As shown in operation S325, the location server 200 determines a distance between the UE and the respective serving base stations. As discussed above, the distance between the UE and a each respective serving base station may be calculated as half of the Rx–Tx time difference for the respective serving base station, or the Rx–Tx time difference divided by two (2), when the timing difference is converted from time to a range measurement. In some embodiments, the location server 200 may also use signal strength measurements or other E-CID information to determine the distance from the UE to a respective serving base station. Additionally, in various embodiments, known base station positions, geographic locations, and/or other like network topology information may be used when calculating the distance from the UE to a respective serving base station. In some embodiments, an offset value, spacing information, and/or other like constant value may be used when calculating the distance from the UE to a respective serving base station.

As shown in operation S330, the location server 200 determines a cell coverage area for the respective serving base stations. As discussed above, the location server 200 may determine a cell coverage area for a respective serving cell by mapping or otherwise charting a polygon having a vertex based on the determined distance from the UE to corresponding base station. For example, the location server 200 may map or chart a circle around respective ones of the serving base stations, where each circle has a radius equal to determined distance from the UE to the respective serving base station. Additionally, in some embodiments, an offset value, spacing information, and/or other like constant value may be taken into account when determining a cell coverage area for respective serving base stations. Furthermore, in various embodiments, known base station positions, geographic locations, and/or other like network topology information may be used when determining a cell coverage area for serving base stations.

As shown in operation S335, if the location server 200 determines that there are more than two serving base stations (as determined in operation S310), then the location server 200 advances to S340 to determine the intersection point of each cell coverage area.

As shown in operation S340, the location server 200 determines an intersection point of each cell coverage area (as determined in operation S330). The intersection point may be a location where a portion of the respective cell coverage areas intersect, overlap, or otherwise converge. In some embodiments, a system configuration may define an amount of overlap or convergence required for a point to be considered an intersection point.

As shown in operation S345, the location server 200 determines a position of the UE based on the intersection point. In various embodiments, the location server 200 may determine that the location of the UE is the intersection point determined in operation S340. In such embodiments, the location server 200 may determine the location of the UE without requiring additional information (e.g., AoA, RSRP, RSRQ, and the like). This is because, when a UE is serviced by more than two base stations, the cell coverage areas do not intersect at more than one location. In such instances, any secondary intersection points may be disregarded.

Once the location server 200 determines a position of the UE based on the intersection point, the location server 200 loops back to operation S305 to receive UE position information.

Referring back to operation S335, if the location server 200 determines that there are not more than two serving base stations (as determined in operation S310), then the location server 200 advances to S350 to determine the intersection points of the cell coverage areas.

As shown in operation S350, the location server 200 determines the intersection points of the cell coverage areas (as determined in operation S330). In instances where a UE is being serviced by two base stations, the cell coverage areas may intersect at more than one location. In such instances, the location server 200 may be configured to determine each intersection point.

As shown in operation S355, the location server 200 differentiates between a UE intersection point and any secondary intersection points. In various embodiments, the location of the UE may be discerned or otherwise differentiated from the secondary intersection point 106 using the AoA, RSRP, RSRQ, and/or other like measurements received at operation S305. Additionally, in some embodiments, previously known cell positioning information, geographic location, and/or other like network topology information may be used to differentiate between a secondary intersection point and a UE intersection point.

As shown in operation S360, the location server 200 determines a position of the UE based on the UE intersection point. In various embodiments, the UE intersection point may be determined to be the position of the UE. In other embodiments, an offset, a constant, known geographic information, and/or other like network topology information may be applied to the UE intersection point in order to determine the location of the UE. It should be noted that in some instances, even when only two base stations are servicing a UE, there may be only one intersection point. In such instances, a similar determination as discussed above with regard to operation S345 may be used to determine the UE's position.

Once the location server 200 determines a position of the UE based on the UE intersection point, the location server 200 advances back to operation S305 to receive UE position information.

The invention being thus described, it will be obvious that the same may be varied in many ways. Such variations are not to be regarded as a departure from the invention, and all such modifications are intended to be included within the scope of the present invention.

I claim:

1. A method for determining a location of a user equipment (UE), the method comprising:
   receiving, by a network element, UE position information from a UE being serviced by a plurality of base stations, the UE position information including a signal reception time and a signal transmission time or a timing advance for at least two of the plurality of base stations,
   the signal transmission time being a measured time for a signal being transmitted by the UE to be received by a base station,
   the signal reception time being a measured time for a signal being transmitted by the base station to be received by the UE, and the timing advance being a difference between the signal transmission time and the signal reception time for the base station; and determining, by the network element, a location of the UE based on the received UE position information.

2. The method of claim 1, wherein the determining comprises:

calculating a difference between the signal reception time and the signal transmission time for each of the at least two base stations; and determining a distance from the UE to each of the at least two base stations, each distance based on half of the calculated difference for a respective one of the at least two base stations.

3. The method of claim 2, wherein the determining further comprises:

determining a cell coverage area for the at least two base stations; and determining an intersection point where each cell coverage area intersects, the location of the UE being based on the intersection point.

4. The method of claim 3, wherein the intersection point is the location of the UE.

5. The method of claim 3, wherein a respective cell coverage area has a radius based on the distance from the UE to a corresponding one of the at least two base stations.

6. The method of claim 1, wherein the receiving comprises:

sending a request message to the UE, the request message including a request for the UE position information and a required response time;

determining if the required response time has lapsed; and receiving a location message if the determining determines that the required response time has not lapsed, the location message including the UE position information.

7. The method of claim 6, wherein the receiving further comprises:

re-sending the request message if the determining determines that the required response time has lapsed and the location message has not been received.

8. The method of claim 1, wherein the receiving comprises:

receiving a location message including the UE position information, the location message being received on a periodic basis.

9. The method of claim 1, wherein one of the plurality of base stations acts as a primary serving cell, and the other base stations of the plurality of base stations act as secondary serving cells.

10. A method for determining a location of a user equipment (UE), the method comprising:

receiving, by a network element, UE position information from a UE being serviced by a plurality of base stations, the UE position information including a signal reception time and a signal transmission time or a timing advance for at least two plurality of base stations, the signal transmission time being a measured time for a signal being transmitted by the UE to be received by a base station, the signal reception time being a measured time for a signal being transmitted by the base station to be received by the UE, and the timing advance being a difference between the signal transmission time and the signal reception time for the base station; and determining, by the network element, a location of the UE based on the received UE position information without requiring at least one of an angle of arrival (AoA) measurement, a reference signals received power (RSRP) measurement, and a reference signals received quality (RSRQ) measurement.

11. A location server for determining a location of a user equipment (UE), the network element configured to:

receive UE position information from a UE being serviced by a plurality of base stations, the UE position information including a signal reception time and a signal transmission time or a timing advance for at least two of the plurality of base stations, the signal transmission time is a measured time for a signal being transmitted by the UE to be received by a base station, the signal reception time is a measured time for a signal being transmitted by the base station to be received by the UE, and the timing advance is a difference between the signal transmission time and the signal reception time for the base station; and determine a location of the UE based on the received UE position information.

12. The location server of claim 11, wherein in the determining, the server is configured to:

calculate a difference between the signal reception time and the signal transmission time for each of the at least two base stations; and determine a distance from the UE to the at least two base stations, each distance is based on half of the calculated difference for a respective one of the at least two base stations.

13. The location server of claim 12, wherein in the determining, the server is further configured to:

determine a cell coverage area for the at least two base stations; and determine an intersection point where each cell coverage area intersects, the location of the UE is based on the intersection point.

14. The location server of claim 13, wherein the intersection point is the location of the UE.

15. The location server of claim 13, wherein a respective cell coverage area has a radius based on the distance from the UE to a corresponding one of the at least two base stations.

16. The location server of claim 11, wherein in the receiving, the server is configured to:

send a request message to the UE, the request message including a request for the UE position information and a required response time;

determine if the required response time has lapsed; and receive a location message if the required response time has been determined to have not lapsed, the location message including the UE position information.

17. The location server of claim 16, wherein in the receiving, the server is further configured to:

re-send the request message if the required response time has been determined to have lapsed and the location message has not been received.

18. The location server of claim 11, wherein in the receiving, the server is configured to:

receive a location message including the UE position information, the location message is received on a periodic basis.

19. The location server of claim 11, wherein one of the plurality of base stations acts as a primary serving cell, and the other base stations of the plurality of base stations act as secondary serving cells.

20. A location server for determining a location of a user equipment (UE), the server configured to:

receive UE position information from a UE being serviced by a plurality of base stations, the UE position information including a signal reception time and a signal transmission time or a timing advance for at least two the plurality of base stations,
- the signal transmission time is a measured time for a signal being transmitted by the UE to be received by a base station,
- the signal reception time is a measured time for a signal being transmitted by the base station to be received by the UE, and
- the timing advance is a difference between the signal transmission time and the signal reception time for the base station; and determine a location of the UE based on the received UE position information without requiring at least one of an angle of arrival (AoA) measurement, a reference signals received power (RSRP) measurement, and a reference signals received quality (RSRQ) measurement.

* * * * *